N. MILNER.
TRAILING VEHICLE.
APPLICATION FILED OCT. 11, 1916.
1,234,788.
Patented July 31, 1917.
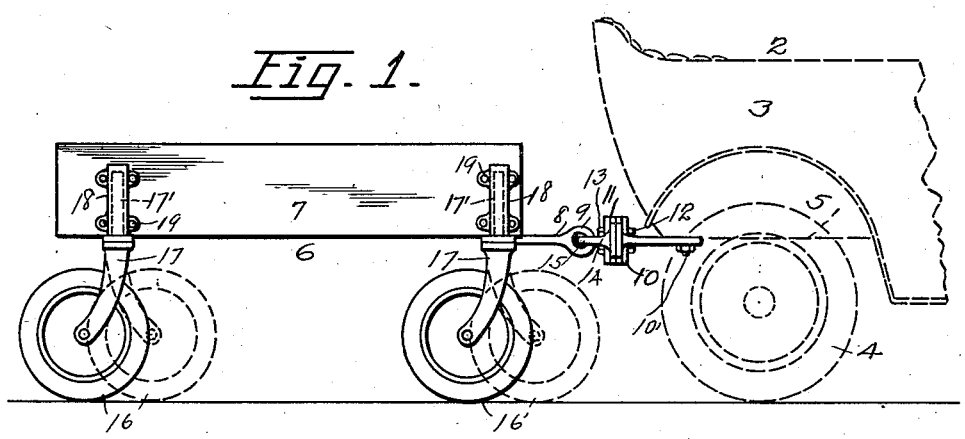
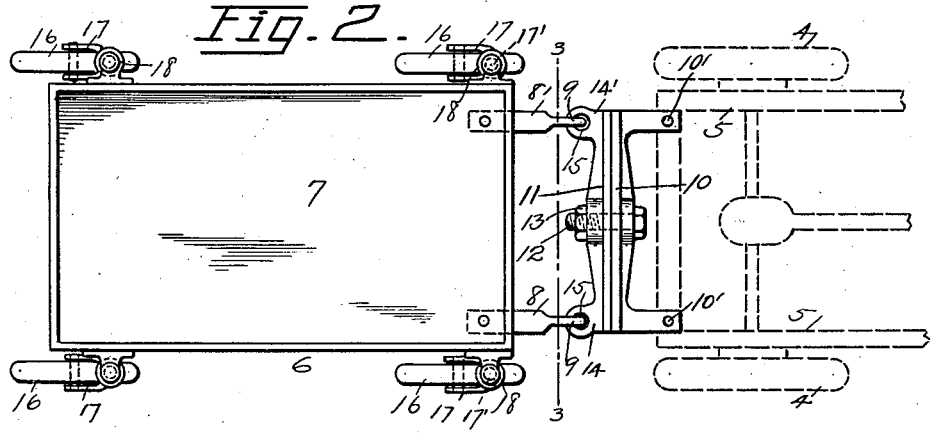
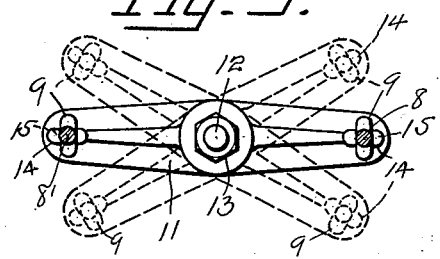
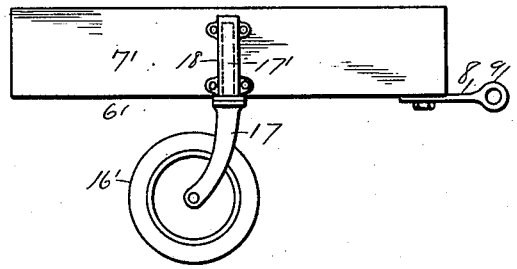
WITNESS
AC Thomas
INVENTOR.
Nugent Milner
BY Harry D. Wallace
ATTORNEY

UNITED STATES PATENT OFFICE.

NUGENT MILNER, OF WATERTOWN, NEW YORK.

TRAILING VEHICLE.

1,234,788. Specification of Letters Patent. Patented July 31, 1917.

Application filed October 11, 1916. Serial No. 124,989.

*To all whom it may concern:*

Be it known that I, NUGENT MILNER, a citizen of the Kingdom of Great Britain, residing at Watertown, in the county of Jefferson and State of New York, have invented certain new and useful Improvements in Trailing Vehicles, of which the following is a specification.

This invention relates to improvements in trailers designed for use in connection with automobiles and other vehicles, and has for its particular object to provide novel and simple means for connecting the trailers to the vehicles, whereby the trailers whether moving forward or backward will follow the track of the propelling vehicle and not cramp or otherwise interfere with or injure either vehicle. A further object is to provide novel and simple means forming a part of the connections between the two vehicles, for allowing the trailer to rock, move or sway laterally independently of the main vehicle without straining or injuring the said connections. And a further object is to provide independent swivel or caster wheels for supporting the trailer which allow the trailer to adjust itself to variations in the level of the roadway, and also allow a certain amount of swiveling or yielding while the trailer is moving forward, as well as backward, so as to insure the perfect tracking of the two vehicles.

I attain these objects by the means set forth in the detailed description which follows and illustrated in the accompanying drawing, in which—

Figure 1 is a side elevation, particularly of the rear portion of an automobile, and one of my trailers attached thereto, the trailer having four wheels.

Fig. 2 is a top plan view of the same.

Fig. 3 is a cross section on an enlarged scale, taken on line 3—3 of Fig. 2; showing the swivel connection between the trailer and the automobile.

Fig. 4 is a side elevation of a trailer having two wheels.

In the drawing, 2 represents generally an automobile or other vehicle, including the body 3, the rear wheels 4, and the chassis 5, all of which parts may follow any of the usual constructions.

6 represents generally what is commonly known as a trailer or vehicle incapable of self-propulsion, which is generally hitched to the rear of a motor or other vehicle, and which includes a body 7, to the forward end of which are applied two spaced bars or reaches 8—8', which are preferably rigidly attached to the body 7 in any suitable manner, but preferably disposed near the opposite sides of the body 7. The free ends of the reaches 8—8' are preferably formed into loops or eyes 9. 10 represents a swivel member, which may be wood or metal, and which is preferably secured in any suitable manner to the rear end of the chassis or body of the vehicle 2, as at 10', the said member being disposed transversely and preferably made rigid on the chassis, as best seen in Figs. 1 and 2. 11 represents a similar movable swivel member, which is disposed parallel to the member 10 and is pivotally connected thereto by a bolt 12, and for convenience in attaching and detaching said members, the bolt is held in place by a nut 13. Near the opposite ends of the member 11 rearwardly projecting arms or lugs 14—14' are disposed, in line with the reaches 8 and 8', and these may be integral with the member 11. The arms 14—14' are provided with loops or eyes 15, to which the eyes of the rods or reaches 8—8' connect, thereby forming similar yielding or hinge-like couplings, for allowing the trailer to move vertically or horizontally independently of the leading vehicle 2. The swivel members 10 and 11 are provided so as to allow the trailer to tilt or rock laterally independently of the main vehicle 2 when uneven or rough portions of the roadway are encountered. The dotted lines in Fig. 3 show the movements of the member 11 relatively to the member 10. By employing two reaches, as 8 and 8', the coupling between the two vehicles may be made shorter than where one reach is used, thus reducing the liability of accidents and at the same time rendering the train more sightly.

Any suitable wheels may be employed for supporting the trailers, but I prefer to use what is known as caster-wheels, in which the wheels 16 are journaled in forks 17, the upper ends 17' of the forks being journaled in boxes or bearings 18, which are suitably secured to the body of the trailer, as by bolts or screws 19. The wheels 16 are disposed eccentrically to the axis of the tines 17', and when the trailer is being drawn forward by the vehicle 2, the wheels are in the positions shown in full-lines in Fig. 1. When, however, the two vehicles are moved or run backwardly the casters or wheels 16, together with the forks 17, instantly change their positions to that shown by dotted-lines in Fig. 1. By the use of the caster wheels as herein shown, the trailers are trundled along either in the forward or backward direction in the manner similar to beds, tables and the like, which are usually provided with similar means. Furthermore, by the use of the independent caster-wheels, the trailing vehicles are more apt to track or follow the leading vehicle, than if the said wheels were journaled on the usual rigid axles. The trailers may be equipped with any suitable number of wheels, and for the purpose of illustrating this feature, I have shown, in Fig. 1, a trailer with four wheels, while in Fig. 4, I have shown the same vehicle with but two wheels.

The provision of the arms or reaches 8—8', and the lugs 14—14', spaced and hinged, as shown, insures the perfect tracking of the trailers, and increases the normal strength of the couplings, while the arrangements of the loops 9 and 15 permit a certain amount of yielding during the swinging or circling of the trailers laterally, as may be required in turning to the right or left corresponding to the movements of the leading vehicle 2. This double reach-connection, by holding the trailer substantially in line with the leading vehicle when moving forward and backward, prevents the buckling, skidding, cramping, as well as interference of the trailer with vehicle 2, when backing-up, or when descending steep inclines, and thereby corrects a grave fault that is quite common where single reaches are employed for connecting trailers to autos and the like.

Fig. 4 illustrates a trailer equipped with but one pair of wheels, preferably of the caster-type.

It is obvious that some changes may be made in the parts of the device, within the scope defined by the appended claims without departing from my invention.

Having thus described my invention, what I claim as new and desire to secure by Letters Patent is—

1. The combination with a vehicle and a trailer, of a combined swivel and hinge coupling for connecting said vehicle and trailer including a rigid swivel member, a movable swivel member pivoted for vertical and transverse rotation to the rigid member and having spaced lugs provided with loop-eyes, and a pair of rods having eyes engaging the loop-eyes of the said lugs.

2. Means for connecting trailers to motor vehicles, including a transversely disposed elongated member rigidly secured to the rear of the vehicle, and a second member engaging the first member throughout its length and pivoted thereto for movement in a vertical plane, said second member having rigid loop-lugs positioned near the lateral sides of the vehicle.

In testimony whereof I affix my signature.

NUGENT MILNER.